United States Patent
Feiten et al.

(10) Patent No.: US 9,374,282 B2
(45) Date of Patent: Jun. 21, 2016

(54) METHOD OF AND SYSTEM FOR MEASURING QUALITY OF AUDIO AND VIDEO BIT STREAM TRANSMISSIONS OVER A TRANSMISSION CHAIN

(75) Inventors: Bernhard Feiten, Berlin (DE); Savvas Argyropoulos, Berlin (DE); Marie-Neige Garcia, Berlin (DE); Nils Leder, Schoenefeld (DE); Peter List, Eppertshausen (DE); Alexander Raake, Berlin (DE); Ulf Wuestenhagen, Gruenheide (DE)

(73) Assignee: DEUTSCHE TELEKOM AG, Bonn (DE)

( * ) Notice: Subject to any disclaimer, the term of this patent is extended or adjusted under 35 U.S.C. 154(b) by 486 days.

(21) Appl. No.: 13/823,788

(22) PCT Filed: Sep. 12, 2011

(86) PCT No.: PCT/EP2011/065762
§ 371 (c)(1),
(2), (4) Date: Mar. 15, 2013

(87) PCT Pub. No.: WO2012/034975
PCT Pub. Date: Mar. 22, 2012

(65) Prior Publication Data
US 2013/0170391 A1    Jul. 4, 2013

(30) Foreign Application Priority Data
Sep. 16, 2010  (EP) .................................... 10177161

(51) Int. Cl.
*H04L 12/26* (2006.01)
*H04L 12/24* (2006.01)
*H04N 17/00* (2006.01)

(52) U.S. Cl.
CPC .............. *H04L 43/00* (2013.01); *H04L 41/069* (2013.01); *H04L 41/5032* (2013.01); *H04L 41/5035* (2013.01); *H04L 43/04* (2013.01); *H04N 17/004* (2013.01); *H04L 43/0829* (2013.01)

(58) Field of Classification Search
None
See application file for complete search history.

(56) References Cited

U.S. PATENT DOCUMENTS

| | | | |
|---|---|---|---|
| 6,326,909 B1 | 12/2001 | Yamaguchi | |
| 2005/0169199 A1* | 8/2005 | Futenma et al. | ............... 370/282 |

(Continued)

FOREIGN PATENT DOCUMENTS

| | | |
|---|---|---|
| JP | 1198016 A | 4/1999 |
| JP | 2007329774 A | 12/2007 |

(Continued)

OTHER PUBLICATIONS

ITU-R Recommendation BS.1387: Method for objective measurements of perceived audio quality (PEAQ), 1998-2001.

(Continued)

*Primary Examiner* — Huy D Vu
*Assistant Examiner* — Teisha D Hall
(74) *Attorney, Agent, or Firm* — Leydig, Voit & Mayer, Ltd.

(57) ABSTRACT

A method for measuring quality of packetized audio and video transmission over a transmission chain includes: providing one or more measurement detectors along the transmission chain; detecting, by the one or more measurement detectors, loss of bit stream packets at one or more measurement points; determining the unique identifier for each detected lost packet; sending, by the one or more measurement detectors, a list of lost packet identifiers to a central monitoring system; constructing, by the central monitoring system, a simulated stream for each measurement point based on a stored error-free stream and the received lost packet identifiers; and evaluating the simulated stream for deriving a quality score for each measurement point.

7 Claims, 1 Drawing Sheet

(56) References Cited

U.S. PATENT DOCUMENTS

| | | | |
|---|---|---|---|
| 2007/0047542 A1 | 3/2007 | Thukral | |
| 2007/0058043 A1 | 3/2007 | Thukral | |
| 2007/0268836 A1* | 11/2007 | Byun et al. | 370/252 |
| 2008/0298448 A1 | 12/2008 | Erman et al. | |
| 2009/0225671 A1 | 9/2009 | Arbel | |
| 2009/0244289 A1 | 10/2009 | Raake | |
| 2010/0182854 A1 | 7/2010 | Takatori | |

FOREIGN PATENT DOCUMENTS

| | | |
|---|---|---|
| JP | 2008005108 A | 1/2008 |
| JP | 2009020764 A | 1/2009 |
| JP | 2009273013 A | 11/2009 |

OTHER PUBLICATIONS

ITU-T Rec. J.247 (Aug. 2008) Objective perceptual multimedia video quality measurement in the presence of a full reference.

ITU-T Recommendation J.246 (Aug. 2008) Perceptual audiovisual quality measurement techniques for multimedia services over digital cable television networks in the presence of a reduced bandwidth reference.

IETF RFC3611.RTP Control Protocol Extended Reports (RTCP XR), Nov. 2003.

Akira Takahashi, Kazuhisa Yamagishi, and Ginga Kawaguti. Recent Activities of QoS/QoE Standardization in ITU-T SG12, NTT Technical Review, Sep. 2008.

S. Winkler, P. Mohandas. The Evolution of Video Quality Measurement: From PSNR to Hybrid Metrics. IEEE Trans. Broadcasting vol. 54, No. 3, Sep. 2008.

Raake, A., Garcia, M.-N., Moeller, S., Berger, J., Kling, F., List P., Johann, J., Heidemann, C. (2008), T-V-Model: Parameter-based Prediction of IPTV Quality, In: Proc. International Con-ference on Acoustics, Speech, and Signal Processing (ICASSP 2008), USA—Las Vegas.

* cited by examiner

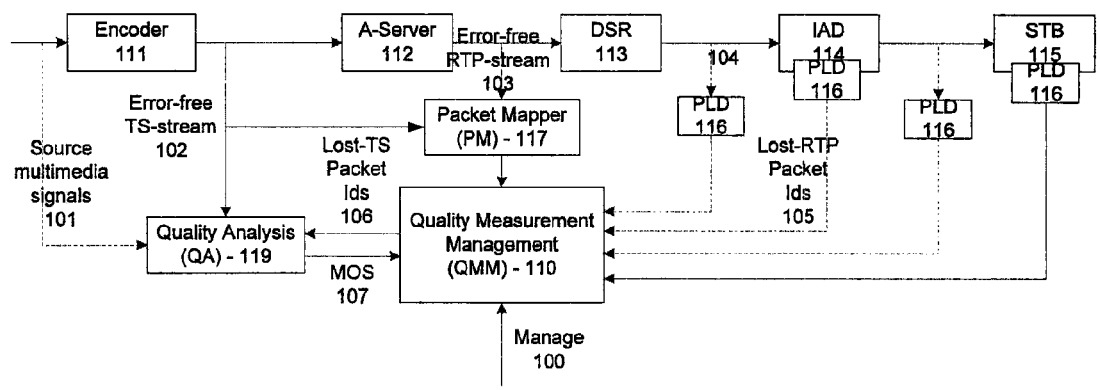

METHOD OF AND SYSTEM FOR MEASURING QUALITY OF AUDIO AND VIDEO BIT STREAM TRANSMISSIONS OVER A TRANSMISSION CHAIN

CROSS-REFERENCE TO RELATED APPLICATIONS

This application is a U.S. National Phase application under 35 U.S.C. §371 of International Application No. PCT/EP2011/065762, filed on Sep. 12, 2011, and claims benefit to European Patent Application No. EP 10177161.6, filed on Sep. 16, 2010. The International Application was published in English on Mar. 22, 2012 as WO 2012/034975 A1 under PCT Article 21(2).

FIELD

The invention relates to quality measurement of audio and video bit stream transmission.

BACKGROUND

Audio and video streams are typically encoded into so called Elementary Streams (ES). The audio and video elementary streams are then packaged into Internet Protocol (IP) packets. Basically, different formats are supported by existing technology.

State-of-the-art bit stream-oriented quality assessment methods analyze the IP packets of the bit stream and derive an estimated quality measure such as a Mean Opinion Score (MOS) reflecting the audio-visual quality of the stream. To this aim, the elementary streams for audio and video are typically de-multiplexed. In further steps quality relevant parameters are extracted from the bit streams for audio and video. Finally, a mathematical model is used to calculate the quality measure from the extracted parameters for audio and video, or intermediate quality measures to be pooled to an overall visual quality estimate.

An IPTV system usually provides a head-end where the streams for all TV channels are aggregated and prepared. The prepared streams are distributed to the customer in a tree-like network structure. Regarding a single TV channel, all customers receive in principal the same stream. It is only the transmission that may cause specific changes to the stream, e.g. packet loss, that may have an influence on the quality.

SUMMARY

In an embodiment, the present invention provides a method of measuring quality of packetized audio and video transmission over a transmission chain. The method includes: a) providing one or more measurement detectors along the transmission chain; b) detecting, by the one or more measurement detectors, loss of bit stream packets at one or more measurement points; c) determining a unique identifier for each detected lost packet; d) sending, by the one or more measurement detectors, a list of lost packet identifiers to a central monitoring system; e) constructing, by the central monitoring system, a simulated stream for each measurement point based on a stored error-free stream and the received lost packet identifiers; and f) evaluating the simulated stream for deriving a quality score for each measurement point.

BRIEF DESCRIPTION OF THE DRAWINGS

The present invention will be described in even greater detail below based on the exemplary FIGURES. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 schematically illustrates an example of an IPTV system.

DETAILED DESCRIPTION

Embodiments of the present invention provide a quality measurement method and system for calculating and estimating the quality as perceived by a user of the IPTV bit stream.

In general terms, embodiments of the invention provide a central quality monitoring method and system which supports the quality estimation for one or more arbitrary points in the transmission chain. One or more packet loss detectors are placed in the transmission chain reporting to the head-end the lost packets for a specific transmission link. In this manner, for example, the quality for each stream as received by an individual user can be calculated, i.e. estimated.

Accordingly, in an embodiment, the invention provides a method of measuring quality of audio and video bit stream transmissions over a transmission chain, the method comprising:
a) providing one or more measurement detectors along the transmission chain;
b) detecting with the one or more measurement detectors the loss of bit stream packets at the one or more measurement point(s);
c) determining a unique identifier for each detected lost packet;
d) each measurement detector sending the list of lost packet identifiers to a central monitoring system;
e) constructing, at the central monitoring system, from a stored error free stream and on the basis of the received lost packet identifiers, a simulated stream for each measurement point; and
f) evaluating the simulated streams for deriving a quality score for each measurement point along the transmission chain.

Instead of extracting and directly measuring the quality-related parameters from the IP stream at the selected monitoring points, the measurement unit(s) only detect the loss of packets at the one or more selected measurement point(s). Each lost packet is noted together with a unique identifier for each packet, i.e. an identifier being unique for each packet. In a next step a message with a list of lost packets identifiers is sent to the central monitoring system provided at the head-end of the entire system. The central monitoring system receives the list with lost packet identifiers and uses it to construct from an error free stream previously stored at the central monitoring system in combination with the list of lost packets, a stream (i.e. a simulated stream) that shows exactly the same error behavior as the transmitted stream monitored at the specific monitoring point. This simulated stream then is evaluated for deriving the MOS with an underlying objective quality estimation method.

The step f) may additionally comprise the step of estimating the quality of the encoding process by comparing the signal at the input of the encoder and at the output.

According to an alternative embodiment of the invention, steps e) and f) are replaced by the steps, at the central monitoring system, of e1') extracting a set of parameters or another quality-related representation from the error free stream, e2')

modifying the extracted set of parameters or representation on the basis of the list of lost packet identifiers, and f) evaluating the modified parameter set or stream representation for deriving a quality score for the transmission along the transmission chain.

A unique identifier of the lost packets is extracted from the RTP time stamp and packet number. Preferably, an additional unique identifier for MPEG-2 transport stream packets is defined that consists of or is derived from presentation time stamp, an additional counter, and continuity counter.

It is also preferred that a mapping table is used to derive the information about lost RTP and MPEG-2 transport stream packets from the information of lost RTP packets, i.e. to map identifiers of lost RTP-packets to lost MPEG-2 transport stream packets.

The estimation of the audio and video quality may be performed according to methods generally known in the field, including methods for estimating the audiovisual quality according to any of [1], [2], [5], [3], [8], all herein incorporated by reference (citations provided below).

The quality measurement systems or methods are generally classified in terms of the quality model types the employ, which are related with a specific type and format of the required input information. A quality model used in a measurement system may pertain to one of the following types, both for audio, video or audiovisual quality estimation: Full Reference (FR): a reference signal is required; Reduced-Reference (RR): partial information extracted from the source signal is required; or No-Reference (NR): no reference signal is required. The respective model input information may pertain to one of the following types: signal/media-based: the decoded video (pixel-information) and decoded audio is required; or parameter-based: bitstream-level information is required. Information can range from packet-header information, requiring parsing of the packet-headers but not (full- or partial) decoding of the bit-stream to the complete decoding of the bit-stream.

The central monitoring system may employ all mentioned model types, since the reference signal, as well as the unencrypted encoded stream are available at the head-end, where the central monitoring system is located. Hence, different embodiments of the system can be envisaged.

For a realization based on a full-reference quality model, the uncompressed stream and the compressed stream need to be buffered, for the later processing of the quality analysis. For the audio stream, the quality model type PEAQ [1] and for the video stream the quality model PEVQ [2] or a similar model can be applied.

For an embodiment based on a no-reference quality model, only the compressed stream needs to be buffered and processed. Different no-reference quality models have been proposed, see e.g. [3]. The ITU-T is currently developing according standards, referred to as P.NAMS (packet-header-based quality prediction) and P.NBAMS (bitstream-based quality prediction) [4]. In an embodiment of the invention according to this case, for each user a stream can be obtained at the central monitoring location that reflects the erroneous stream played out by her/his set-top box. Using respective packet-header or bitstream-based quality monitoring methods, a quality estimate for the respective user can be obtained.

Main parts of the processing of the uncompressed and compressed stream, which is required for the quality analysis, may also be performed immediately when the signals pass through the encoders, for example at the head-end. The advantage here is that only some intermediate results of the analysis will need to be buffered. For example, in one of the preferred embodiments of the invention, a quality model is used that distinguishes between the quality-impact due to coding and the quality impact due to transmission (e.g. in case of packet loss). Here, the coding-contribution to quality could be captured directly, and the loss-contribution to quality be calculated based on the information received from the respective measurement point(s). In an alternative embodiment of the invention, the information could consist of a set of parameters captured from the in-tact stream, with this set being corrected based on the end- or measurement-point information. Such parameters could be, for example, the loss probability, the loss correlation within a given time-frame, the number of packets lost in a row, the corruption duration, i.e. the duration for which a packet-loss related artifact will persist, or other similar parameters. Other, more bitstream-related parameters could be: For video the position or index of a lost slice, the frame type, the residual energy (i.e. the sum of squares of transform coefficients), the mean and maximum magnitude (and phase) of motion vectors, the mean and maximum number of partitions for inter macroblocks, the mean squared error estimation of the lost macroblocks, or the spatial extent in terms of the number of macroblocks affected by a loss; for audio, example parameters are the indices of affected audio frames, descriptors of their spectro-temporal content—e.g. giving information about the harmonic structure—of the affected portion—, or include information about whether they contain critical information such as onsets. In case of parametric codecs, codec-specific information such as the bit-classes of the contained bits can be exploited.

In an alternative embodiment, the audio and video payload information could be represented in terms of a signal-related reduced reference, where more content-specific aspects could be considered. Here, the required storage capacity would be lower than in the case of storing the entire non-degraded stream, but model predictions can be expected to be more accurate than in case of a purely parametric approach. An example for such a reduced-reference quality model is the one standardized as J.246 [5].

According to a preferred embodiment of the invention, a combination of the above mentioned quality models can be applied. Signal/media-based features as well as packet-header or bitstream-based features can be used, resulting in so-called hybrid quality-models (see [6]). The advantages of models that are based on both bitstream-information and the player output are expected to lead to a best-possible quality estimation performance.

The centralized quality measurement approach according to embodiments of the invention provides several advantages:

The system according to the invention requires a quality analysis unit in one instance only, i.e. at a central monitoring system. Accordingly, it can have highest complexity and will thus allow for best possible quality estimates.

If the quality analysis unit is located in the head-end, the incoming or source signal may be considered, too. As explained previously herein, this enables applying a so-called full reference quality estimation algorithm, using the incoming or source signal as the reference. In case of a respective embodiment the present invention, the modified stream is compared with this reference, for better estimating the quality of the encoding and compression process, taking content characteristics into consideration.

In many implementations, bitstream- or packet-header-based quality assessment methods calculate an audio or video quality MOS using at least two terms: One term describes the quality influence of the encoding and compression stage. A second term considers the influence due to transmission errors. In case of a respective embodiment of the invention, the analysis and calculation for the first term is required only once, as the same TV stream is delivered to many users. However, this coding impairment estimate will be valid for all users watching the respective channel. In this embodiment of the invention, the second term, estimating the quality contribution due to IP-transmission, is calculated individually for each monitoring point, either somewhere along the transmission line, or at the STB of the user. This allows the overall computation load to be reduced significantly.

Required storage capacity can be reduced by applying a reduced-reference at the central location instead of a full reference, and applying a respective quality model.

A quality assessment using a hybrid quality model can be achieved that can be located at a central position, allowing the quality as perceived by individual viewers to be assessed almost exactly from the viewer's perspective.

The required packet loss detectors are very simple, and thus only very low costs arise to place them at any kind of location along the transmission chain, e.g. also in every set-top box.

The quality analysis of the stream can be based on the unencrypted streams available at the head-end. The stream is encrypted after the encoding. Other quality models that only receive encrypted streams show systematically lower performance.

Other aspects, features, and advantages will be apparent from the description above, as well as from the description that follows, including the FIGURES and the claims.

The following description focuses on an exemplary embodiment relating to multimedia transmission using MPEG-2 Transport Streams, but the invention also works for other stream formats.

FIG. 1 shows an example of an IPTV system. The incoming audio and video streams 101 are adapted to the delivery bit rate, at encoder side employing standardized audio and video codecs. In this example, the output bit streams are multiplexed into a MPEG-2 Transport Stream (TS) and packaged into User Datagram Protocol (UDP) packets (102 produced by unit 111, FIG. 1). A so-called acquisition server (A-Server, 112) adapts the streams as needed for the delivery. In the A-Server, the transport stream packets are encrypted and packaged into Real-Time Transport Protocol (RTP) packets 103. The output streams from the A-Servers are distributed over the core network to specific distribution servers (D-Servers) (not shown in the FIGURE). The D-Servers provide mechanisms for a fast channel change and resend in case of errors. Specific routers, the Dynamic Source Routers (DSRs, 113), are used for distributing the TV channels through a multicast enabled hierarchical aggregation network. For the resend of packets and for the fast channel switching, unicast delivery is used. At the end user, access is provided by a DSL modem and an Internet Access Device (IAD, 114). The IAD is connected to the set-top box (STB, 115). The set-top box contains the media player for finally decoding the audio and video signals.

The central quality monitoring method/system according to the invention allows for estimating the quality of the entire IPTV system. The central quality monitoring system according to the exemplary embodiment shown in FIG. 1 comprises a quality analysis unit (QA, 119), a packet mapper unit (PM, 117), a plurality of packet-loss-detectors (PLDs, 116), and a quality measurement management unit (QMM, 110).

The quality analysis unit captures the stream 102 between the output of the encoder and the input of the acquisition server. At this point of the transmission chain, it is assumed that the stream is still error-free. The input stream 101 may be considered in addition, in terms of an explicit or reduced reference, as shown in FIG. 1 by the dashed line. The error-free stream 102 is stored in a buffer of the quality analysis unit for a certain time, so that it can be used at a later stage for quality assessment, as described below.

The data stored in the buffer is organized in a sequence of packets according to the packetization used for the delivered streams. According to this embodiment of the invention, each packet is tagged with a unique packet identifier.

Using the received packet loss information for a given measurement point 105, the stream for the respective user is generated at the central monitoring location.

In the preferred embodiment of the invention, the quality estimation for the audio and video compression is only calculated once. This calculation corresponds to the loss-free transmission. It can be reused for calculating the quality for individual monitoring points, as all users receive an identically encoded signal.

The quality impact due to transmission can be different for each individual monitoring point, since packet loss events for different users typically are of different nature, depending on where in the network they occur. Accordingly, the transmission quality 107 needs to be calculated individually for each monitoring point. This is accomplished by considering the reported list of lost-packet identifiers together with the buffered error-free stream. According to the invention, the knowledge of the lost parts of the stream is used to determine precisely how the corrupted stream looks or sounds like.

Finally, the loss-free quality estimation describing the quality due to encoding is combined with the individual analysis provided by the different monitoring points, e.g. the MOS for each end user in the system can be calculated 107. A quality estimation model such as the T-V-Model algorithm can be used to calculate a MOS value [8].

In case that coding and transmission contributions are not considered separately, the user-specific stream generated from the obtained error information and initial source stream is directly used as input for an audio, video and/or audiovisual quality model, where this model may pertain to any of the previously described quality model types.

The unique packet identifiers, mentioned above, are also used in the packet mapper unit. Some packaging and encryption solutions require a special mapping solution. A solution for UDP and RTP MPEG Transport Streams is described below. This solution also supports encrypted streams, as a mapping of the encrypted packets to the unencrypted packets can be provided.

Note that in an alternative embodiment of the invention, the central monitoring solution could capture the error-free streams only directly after the A-server, accessing the resulting RTP-packets. In this case, however, no access to encrypted payloads will be possible, and only quality models that employ header information are feasible. In the following, we will focus on the embodiment of the invention that principally enables access to the payload, and can thus take advantage of more sophisticated and thus precise quality model types.

As described earlier, the A-Server 112 shown in FIG. 1 encrypts the streams and stores the packets in RTP packets 103. The A-server receives a UDP-based transport stream. The transport stream packets are reordered and the transport stream payload is encrypted. Several transport stream packets are then bundled into one RTP packet.

The packet mapper unit supports the mapping of encrypted transport stream packets in RTP packets to transport stream packets in unencrypted UDP packets. The mapping system generates a description that ultimately allows determination of which transport stream packets of the unencrypted stream have been lost.

A mapping system for RTP transport stream packets to the originating transport stream packets requires a unique identifier for transport stream packets. Besides the multicast address, the program identifier, and the stream identifiers (PIDs), which are constant for the whole stream, the MPEG-2 Transport Stream provides presentation time stamps (PTS) that change at the border of every Packetized Elementary Stream (PES) frame. Also, a 4 bit continuity counter CC is provided which increments from one transport stream packet to the next. As it is likely that a PES frame comprises more than 16 packets, and thus the CC is reset, a further counter is needed to derive a unique counter from the stream. It is assumed that an additional counter AuxCnt of 11 bit will guarantee that the derived identifier for transport stream packets is unique. According to a preferred embodiment, the identifier has the following format.

TsPcktId: PTS (33 bit), AuxCnt (11 bit), CC (4 bit)

It is assumed that the packets have the correct order at the time the TsPcktId is derived. The identifier is used internally to the mapper in terms of a table mapping TS-packets and RTP packets.

The analysis of the audio and video streams will be related to the sequence of the TsPcktIds.

An RTP packet can be uniquely identified by considering the RTP time stamp and the RTP sequence number:

RtpPcktId: RtpTimeStamp (32 bit), RtpSeqNr (16 bit)

In a next step, it is analyzed which transport stream packets are present in which RTP packet. It is assumed that directly after the A-server, the packets still have the same order, and that no packets are lost at that time. The result of this measurement is stored in a list of the following form:

RtpTsMap: RtpPcktId, TsPckId0, TsPckId1, . . . , TsPckIdn

This mapping declares which transport stream packets are contained in an RTP packet. The stream of these mapping entries can now be used to find out which transport stream packets have been lost in case that a loss of an RTP packet has been detected.

The one or more packet loss detectors 116 can be provided at several locations in the transmission chain. Exemplary monitoring points are the set-top box 115, the Internet Access Device 114, or at different points in the network such as the D-Server, or the DSR 113. Further monitoring points may be located at the switches of the aggregation network. Preferably, lost packets detection is located at the set-top box 115, as it will most likely correspond best to the video and the sound presented to the end user.

Alternatively, the packet loss detectors can be implemented on the Internet Access Device 114 or on an additional subsystem placed between the Internet Access Device and the set-top box. This supports measurement results that are expected to be nearly as accurate as the implementation in the set-top box.

Packet loss detectors for monitoring the quality of multicast streams are preferably located at each stage of the delivery chain. However, the quality for individual users cannot be determined by this alternative as in a later stage of the chain, further packets may have been lost. Also, a packet resend mechanism may be applied in the system, and will then modify the traffic.

A packet loss detector that detects the resend request preferably helps to estimate the quality for individual set-top boxes in a network centric manner. Such a packet loss detector is preferably located at the output of a DSR. The packets requested for being resent can be regarded as lost. The resent packets can be monitored. From the network traffic analysis it could be estimated how likely it is that the resent packet will reach the set-top box in time and thus be considered as restored. This information can help for deriving quality parameters even in case that finally no loss occurred. The packets well received around the lost packet(s) can be employed to estimate the effects of error-propagation. Nevertheless, this packet loss detector is expected to be less reliable than a packet loss detector located in the set-top box. For example, lost packets that were—for some reason—not requested to be resent, cannot be detected using this approach.

A preferred "light weight" packet loss detector, as it can be implemented in the set-top box or in the Internet Access Device, is described below. The implementation of the loss detector for RTP transport stream packets comprises the following steps:

Within the Internet Access Device (114), every incoming RTP MPEG-2 transport stream packet, unicast and multicast, is monitored.

The appearance of a new RTP SSRC invokes a new monitoring track

After a while being inactive, the monitoring track is stopped again

Not all sequence numbers need to be stored

Only RtpPcktIds of lost packets need to be stored in a list. A lost RTP packet is detected when the RTP sequence number is not consecutive.

If a missing packet of the sequence arrives later, then RtpPckId of the loss is taken out of the list again (e.g. arrives due to it being resent).

If the missing packet does not arrive within a certain time slot, the packet is marked as definitely lost.

The list of lost packets can be reported periodically, threshold-based or on demand to the central monitoring server. The way how the reporting occurs can be configured remotely. The reporting may use the RTCP XR protocol [7] or an extended version of it.

The central monitoring system uses these reports to calculate the individual MOS values for the individual monitoring point under consideration, by reconstructing, as described above, the transmitted stream for the respective user, or a reduced version or parametric description of it.

The quality measurement management unit 110 collects the lost-packets messages from the one or more packet loss detectors, together with other related information, such as the location of the monitoring point. The quality measurement management unit evaluates which transport stream packets have been lost. In particular, from the received RTP packet identifier it is retrieved which transport stream packets have been lost. This information is passed to the quality analysis unit. The quality analysis unit takes the information about the lost transport stream packets into account, reconstructs a simulated stream containing the packet loss errors and calculates the individual MOS results and further related quality measurements. This information is returned and further processed by the quality measurement management unit. The quality measurement management unit provides an interface for controlling and managing the central monitoring system in total.

While the invention has been illustrated and described in detail in the drawings and foregoing description, such illustration and description are to be considered illustrative or exemplary and not restrictive. It will be understood that changes and modifications may be made by those skilled in the art, within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

Furthermore, in the claims the word "comprising" does not exclude other elements or steps. A single unit may fulfil the functions of several features recited in the claims. Any reference signs in the claims should not be construed as limiting the scope.

LIST OF REFERENCES (ALL INCORPORATED HEREIN BY REFERENCE)

[1] ITU-R Recommendation BS.1387: Method for objective measurements of perceived audio quality (PEAQ).
[2] ITU-T Rec. J.247 (08/08) Objective perceptual multimedia video quality measurement in the presence of a full reference
[3] US Patent application number: 20090244289; Title: AUDIO-VISUAL QUALITY ESTIMATION. Inventors: Sebastian Moeller, Alexander Raake, Marie-Neige Garcia.
[4] Akira Takahashi†, Kazuhisa Yamagishi, and Ginga Kawaguti. Recent Activities of QoS/QoE Standardization in ITU-T SG12. NTT Technical Review.
[5] ITU-T Rec. J.246 (08/08) Perceptual audiovisual quality measurement techniques for multimedia services over digital cable television networks in the presence of a reduced bandwidth reference.
[6] S. Winkler, P. Mohandas. The Evolution of Video Quality Measurement: From PSNR to Hybrid Metrics. IEEE Trans. Broadcasting Vol. 54, No. 3, September 2008.
[7] IETF RFC 3611. RTP Control Protocol Extended Reports (RTCP XR).
[8] Raake, A., Garcia, M.-N., Möller, S., Berger, J., Kling, F., List, P., Johann, J., Heidemann, C. (2008), T-V-Model: Parameter-based Prediction of IPTV Quality, In: Proc. International Conference on Acoustics, Speech, and Signal Processing (ICASSP 2008), USA-Las Vegas.

The invention claimed is:

1. A method of measuring quality of packetized audio and video transmission over a transmission chain, the method comprising:
   a) providing one or more measurement detectors along the transmission chain;
   b) detecting, by the one or more measurement detectors, loss of bit stream packets at one or more measurement points;
   c) determining a unique identifier for each detected lost packet;
   d) sending, by the one or more measurement detectors, a list of unique identifiers corresponding to lost packets to a central monitoring system;
   e) constructing, by the central monitoring system, a simulated stream for each measurement point corresponding to a respective bit stream having lost packets based on a stored error-free stream and the received list of unique identifiers; and
   f) evaluating each constructed simulated stream to derive a quality score for each measurement point;
   wherein a unique identifier for a MPEG-2 transport stream packet comprises or is derived from a presentation time stamp, an additional counter, and a continuity counter.

2. The method of claim 1, wherein step f) further comprises:
   estimating the quality of an encoding process by comparing the signal at the input of the encoder and at the output.

3. The method of claim 1, wherein a mapping table derives information about lost MPEG-2 transport stream packets from information of lost RTP packets.

4. A method of measuring quality of packetized audio and video transmission over a transmission chain, the method comprising:
   a) providing one or more measurement detectors along the transmission chain;
   b) detecting, by the one or more measurement detectors, loss of hit stream packets at one or more measurement points;
   c) determining a unique identifier for each detected lost packet;
   d) sending, by the one or more measurement detectors, a list of unique identifiers corresponding to lost packets to a central monitoring system;
   e1) extracting, by the central monitoring, system, a set of parameters from an error-free stream;
   e2) modifying, by the central monitoring system, the extracted set of parameters based on the list of unique identifiers; and
   f) evaluating the modified parameter set to derive a quality score for the transmission along the transmission chain;
   wherein a unique identifier for a MPEG-2 transport stream packet comprises or is derived from a presentation time stamp, an additional counter, and a continuity counter.

5. The method of claim 4, wherein a mapping table derives information about lost MPEG-2 transport stream packets from information of lost RTP packets.

6. A system for measuring quality of audio and video bit stream transmissions over a transmission chain, comprising:
   one or more measurement detectors provided along the transmission chain, configured to detect loss of bit stream packets at one or more measurement points, and to determine a unique identifier for each detected lost packet; and
   a central monitoring system, configured to:
      receive a list of unique identifiers corresponding to lost packets from tae one or more measurement detectors;
      construct a simulated stream for each measurement point corresponding to a respective hit stream having lost packets based on a stored error-free stream and the received list of unique identifiers; and
      evaluate each simulated stream to derive a quality score for each measurement point;
   wherein a unique identifier for a MPEG-2 transport stream packet comprises or is derived from a presentation time stamp, an additional counter, and a continuity counter.

7. A system for measuring quality of audio and video bit stream transmissions over a transmission chain, comprising:
   one or more measurement detectors provided along the transmission chain, configured to detect loss of bit stream packets at one or more measurement points, and to determine a unique identifier for each detected lost packet; and a central monitoring system, configured to:
receive a list of unique identifiers corresponding to lost packets from the one or more measurement detectors;
extract a set of parameters from a stored error-free stream;
modify the extracted set of parameters based on the list of unique identifiers; and
evaluate the modified parameter set to derive a quality score for transmission along the transmission chain;
wherein a unique identifier for a MPEG-2 transport stream packet comprises or is derived from a presentation time stamp, an additional counter, and a continuity counter.

* * * * *